(12) United States Patent
Narita

(10) Patent No.: US 9,004,017 B2
(45) Date of Patent: Apr. 14, 2015

(54) WATER HEATER

(71) Applicant: Paloma Co., Ltd., Nagoya-Shi (JP)

(72) Inventor: Hirohisa Narita, Nagoya (JP)

(73) Assignee: Paloma Co., Ltd., Nagoya-Shi (JP)

( * ) Notice: Subject to any disclaimer, the term of this patent is extended or adjusted under 35 U.S.C. 154(b) by 179 days.

(21) Appl. No.: 13/740,389

(22) Filed: Jan. 14, 2013

(65) Prior Publication Data

US 2013/0214053 A1  Aug. 22, 2013

(30) Foreign Application Priority Data

Feb. 22, 2012 (JP) ................. 2012-036467

(51) Int. Cl.
*F24H 9/20* (2006.01)
*C02F 5/00* (2006.01)
*F24D 19/00* (2006.01)
*F24H 1/12* (2006.01)

(52) U.S. Cl.
CPC .............. *F24H 9/2035* (2013.01); *F24H 1/124* (2013.01); *C02F 5/00* (2013.01); *F24D 19/0092* (2013.01)

(58) Field of Classification Search
CPC ......... F24H 1/124; F24H 9/2035; F24H 1/12; F24H 9/2007
USPC ................... 122/14.3, 14.1, 14.2, 14.22, 429; 366/279–280, 315, 342–344; 165/85, 165/95, 109.1; 134/187, 184
See application file for complete search history.

(56) References Cited

U.S. PATENT DOCUMENTS

| 2002/0040876 A1* | 4/2002 | Martin et al. ................. 210/748 |
| 2009/0301577 A1* | 12/2009 | Carter et al. ................. 137/484.2 |
| 2012/0090560 A1* | 4/2012 | Iwama et al. ................. 122/14.3 |

FOREIGN PATENT DOCUMENTS

| GB | 2358971 A * | 8/2001 | ............... H05B 1/02 |
| JP | 2003-254615 A1 | 9/2003 | |

* cited by examiner

*Primary Examiner* — Steven B McAllister
*Assistant Examiner* — Ko-Wei Lin
(74) *Attorney, Agent, or Firm* — Burr & Brown, PLLC

(57) ABSTRACT

A water heater includes a bypass that is formed, on the side of a water supply pipe, branching from a main water path and bypassing a part of the main water path, and a flow path switching unit (a valve and a stepping motor) that is formed at a branching portion of the main water path and the bypass. The flow path switching unit is controlled by a controller and that can selectively switch a flow path between the main water path and the bypass. A microbubble generator generating microbubbles is provided on the bypass, the microbubble generator including a water agitator portion, a compression portion and a decompression portion. When the controller determines that scale has built up, the flow path is switched to the bypass by the flow path switching unit, and water containing microbubbles is caused to flow inside the water heater.

1 Claim, 3 Drawing Sheets

WATER HEATER

CROSS-REFERENCE TO RELATED APPLICATION

This application claims the benefit of Japanese Patent Application Number 2012-036467 filed on Feb. 22, 2012, the entirety of which is incorporated by reference.

BACKGROUND OF THE INVENTION

1. Field of the Invention

The present invention relates to a water heater that heats water from a water supply pipe using a heat exchanger provided with a burner, and that delivers hot water from a hot water delivery pipe.

2. Description of Related Art

A water heater can deliver hot water at a predetermined temperature to a bathroom etc. from a hot water delivery pipe. A water supply pipe, to which water is supplied from a public water supply, is connected to the inlet side of a heat exchanger that is provided with a burner. A hot water delivery pipe is connected to the outlet side of the heat exchanger. When water flows into the heat exchanger in the water heater via the water supply pipe, the water is heated by heat exchange between the burner combustion gas and the water.

However, it is well known that in areas with a high level of water hardness, after years of use, scale builds up in the heat exchanger. Due to this build-up of scale, the heat transfer efficiency of the heat exchanger deteriorates, and a fin temperature rises, thus leading to deterioration in heat efficiency. Furthermore, if use is continued in this state, the precipitation and build up of scale increases, and eventually a heat exchanger tube cracks and leaks water. As a result, the water heater can no longer be used. Here, as disclosed in Japanese Patent Application Publication No. JP-A-2003-254615, an invention is known in which an abnormal temperature sensor is provided in the heat exchanger. When the abnormal temperature sensor detects a temperature equal to or greater than a pre-set specified temperature as a result of a heat rise after shut off of the hot water supply, it is determined that abnormal heating of the heat exchanger has occurred as a result of deteriorated heat efficiency due to the build-up of scale. In the conventional device, the abnormal heating is notified to a user and a maximum burning capacity value of the burner is lowered, when delivery of hot water is restarted. Therefore, the water heater where the scale is built up can be used even before it is repaired.

However, the above-mentioned invention disclosed in Japanese Patent Application Publication No. JP-A-2003-254615, simply allows temporary use of the water heater during and after the build-up of scale, and the water heater does not remove the scale itself. In the end, special maintenance is necessary to remove the scale.

SUMMARY OF THE INVENTION

In light of the above, the present invention provides a water heater in which the automatic removal of scale is possible, and special maintenance relating to the removal of scale becomes unnecessary.

A first aspect of the invention provides a water heater including a burner, a heat exchanger that is heated by the burner, a water supply pipe and a hot water delivery pipe that are connected to the heat exchanger respectively, and a control unit controlling combustion by the burner. Water passing though the heat exchanger is heated by the burner, and hot water is delivered.

When a temperature detected by a temperature detection unit that is provided on the hot water delivery pipe reaches a predetermined temperature due to heat rise after hot water delivery is stopped, the control unit determines that scale has built up inside pipes. A bypass branching from a main water path is formed on the water supply pipe to bypass a part of the main water path. A flow path switching unit is provided at a branching portion of the main water path and the bypass, the flow path switching unit being controlled by the control unit and being able to selectively switch a flow path between the main water path and the bypass. A microbubble generator for generating microbubbles is provided on the bypass. The microbubble generator includes a water agitator portion, a compression portion and a decompression portion. When the control unit determines that scale has built up, the flow path is switched by the flow path switching unit so that the water passes through the bypass, and then the water containing the generated microbubbles flows inside the water heater.

A second aspect of the invention, according to the configuration of the first aspect, the agitator portion houses a swivel wheel that rotates as a result of an inflow of water. The compression portion is communicatively connected to the agitator portion and serves as a tapered flow path whose diameter narrows progressively toward the downstream side. The decompression portion is communicatively connected to the compression portion and serves as a tapered flow path whose diameter widens progressively toward the downstream side.

According to the first aspect of the invention, it is possible to automatically remove scale using microbubbles. Thus, special maintenance relating to the removal of scale is not necessary.

According to the second aspect of the invention, in addition to the effects of the first aspect, a microbubble generator having a compact structure can be easily assembled in a bypass.

DETAILED DESCRIPTION OF THE INVENTION

Hereinafter, an embodiment of the present invention will be explained with reference to the drawings.

Figure 1:
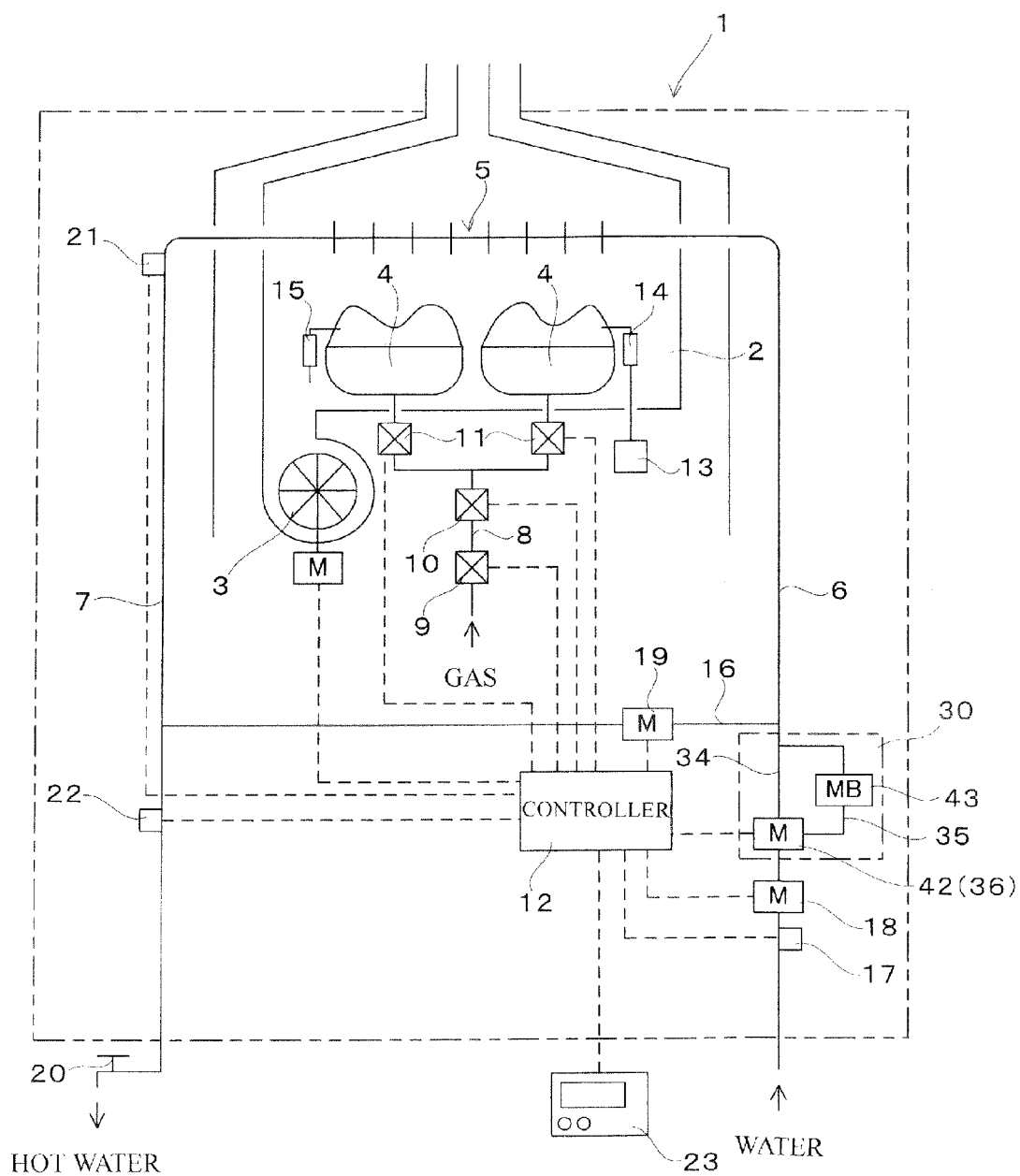
FIG. 1 is a schematic diagram of a water heater.

FIG. 1 is a schematic diagram showing an example of a water heater 1. In a main body of the water heater 1, a combustion chamber 2 is provided with an air supply fan 3. In the combustion chamber 2, burners 4 and a heat exchanger 5 are provided. The burners 4 perform combustion of mixed gas where fuel gas and primary air from the air supply fan 3 are mixed, and the heat exchanger 5 connects a water supply pipe 6 and a hot water delivery pipe 7. Further, the heat exchanger 5 is heated as a result of the combustion by the burners 4. A master solenoid valve 9, a gas proportional valve 10 and switching solenoid valves 11 are respectively provided in a gas pipe 8 to the burners 4, in order from an upstream side of the gas pipe 8. Each of the valves can be controlled by a controller 12 as a control unit. A reference numeral 13 denotes an igniter, a reference numeral 14 denotes an ignition electrode and a reference numeral 15 denotes a flame rod.

Further, a bypass pipe 16, which bypasses the heat exchanger 5, is connected between the water supply pipe 6 and the hot water delivery pipe 7. A water volume sensor 17 and a water volume servo 18 are provided further on the upstream side of a position at which the bypass pipe 16 is connected to the water supply pipe 6. The water volume sensor 17 detects a volume of water flowing through the water supply pipe 6, and the water volume servo 18 controls the volume of water flowing through the water supply pipe 6. Further, a bypass servo 19 provided on the bypass pipe 16 controls a volume of water flowing through the bypass pipe 16. The water volume sensor 17, the water volume servo 18 and the bypass servo 19 are each electrically connected to the controller 12. Meanwhile, a first thermistor 21 and a second thermistor 22 are provided on the hot water delivery pipe 7. The first thermistor 21 is a temperature detection unit that detects an outlet temperature from the combustion chamber 2 on the upstream side of the hot water delivery pipe 7. The second thermistor 22 detects a hot water delivery temperature further on the downstream side of the bypass pipe 16. The first and second thermistors 21 and 22 are also electrically connected to the controller 12. A reference numeral 23 denotes a remote control that is electrically connected to the controller 12, and the remote control 23 is provided with an operation switch, buttons to change a set temperature, a display portion and so on.

Figure 2:
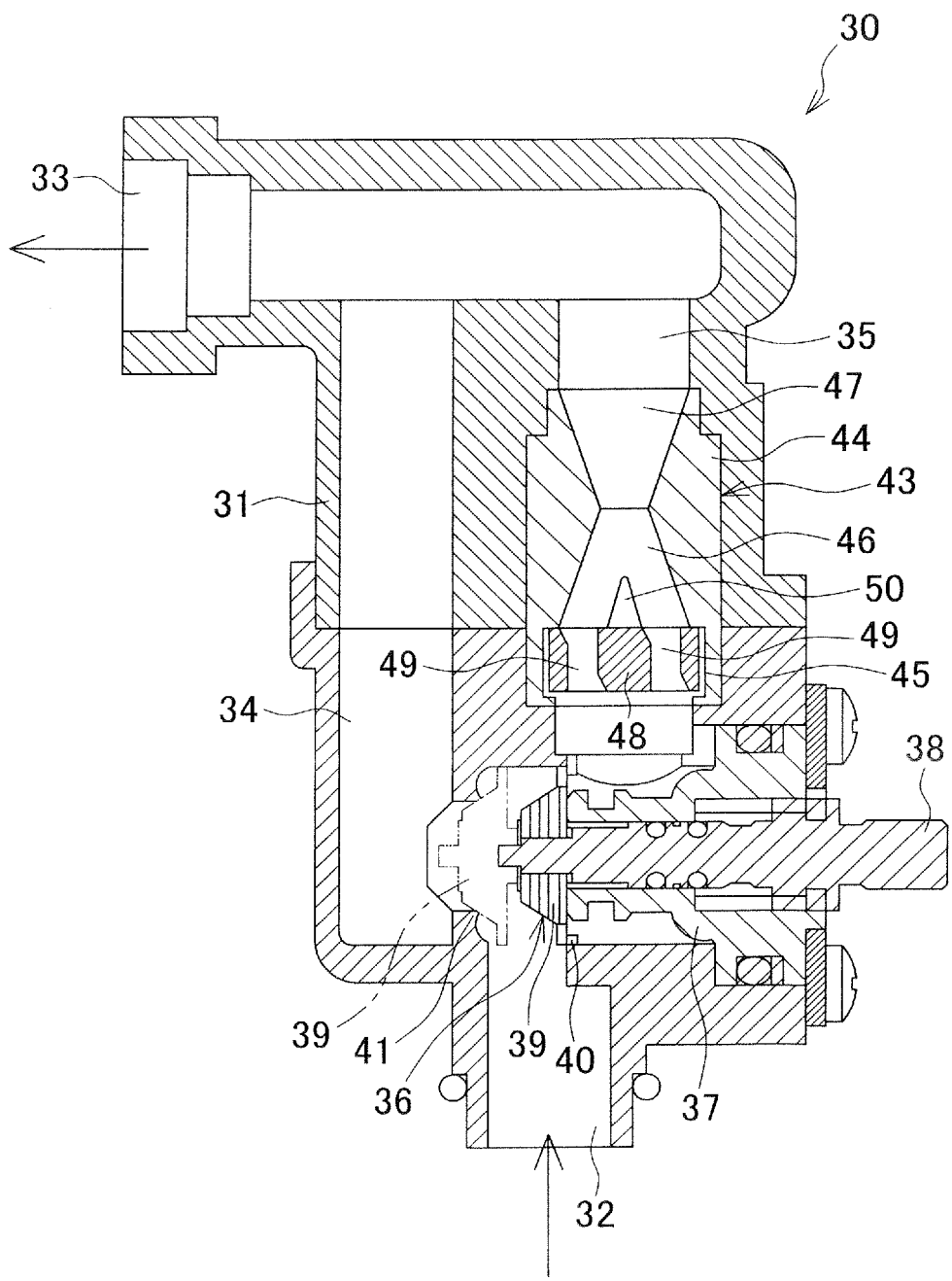
FIG. 2 is an explanatory diagram of a switching portion.

Further, a microbubble switching portion 30 is provided on the water supply pipe 6, on the upstream side of the position at which the bypass pipe 16 is connected to the water supply pipe 6. As shown in FIG. 2, in the switching portion 30, a water inlet 32 is formed at a lower portion of a casing 31 and connected to the upstream side of the divided water supply pipe 6, while a water outlet 33 is formed at an upper portion of the casing 31 and connected to the downstream side of the divided water supply pipe 6. In addition, a main water path 34 connected to the water supply pipe 6 is formed between the water inlet 32 and the water outlet 33. A bypass 35 is formed that bypasses a part of the main water path 34. The bypass 35 branching from the main water path 34 on the downstream side of the water inlet 32, and rejoins the main water path 34 on the upstream side of the water outlet 33.

A reference numeral 36 denotes a valve, which is provided with a retention tube 37, a valve stem 38 and a valve body 39. The retention tube 37 is assembled onto the casing 31 so as to protrude into the bypass 35 and extends in the left-right direction in FIG. 2. The valve stem 38 is screwed to the retention tube 37 and protrudes into a branching position at which the main water path 34 and the bypass 35 branch. The valve body 39 is attached to a leading end of the valve stem 38. A first valve seat 40 is formed on the side of the bypass 35 at the branching position, while a second valve seat 41 is formed on the side of the main water path 34. In a first position of the valve stem 38, the valve body 39 comes into contact with the first valve seat 40 in such a manner that the bypass 35 is blocked off and the main water path 34 is opened, as shown in FIG. 2. In a second position of the valve stem 38, the valve body 39 comes into contact with the second valve seat 41 in such a manner that the main water path 34 is blocked off and the bypass 35 is opened, as shown by broken lines in FIG. 2. The valve stem 38 is electrically connected to the controller 12 so as to be rotated by driving of a stepping motor 42 (not shown in FIG. 2). Thus, the valve stem 38 can be selectively moved forward and rearward between the first position and the second position. The valve 36 and the stepping motor 42 form a flow path switching unit.

Further, a microbubble generator 43 is provided in the bypass 35 on the downstream side of the valve 36. The microbubble generator 43 has a cylinder-shaped main body 44 in which an agitator portion 45 into which water flows, a compression portion 46 and a decompression portion 47 are provided. The compression portion 46 is communicatively connected to the agitator portion 45 on the downstream side, and serves as a tapered flow path whose diameter narrows progressively toward the downstream side. The decompression portion 47 is communicatively connected to the compression portion 46 on the downstream side and is coaxial with the compression portion 46. The decompression portion 47 serves as a tapered flow path whose diameter widens progressively toward the downstream side. A swivel wheel 48 is housed inside the agitator portion 45. The swivel wheel 48 is a disc-shaped body that is rotatably housed inside the agitator portion 45 and that can block the upstream end of the compression portion 46. A plurality of inflow paths 49 are bored into the swivel wheel 48 such that the inflow paths 49 are inclined with respect to an axis of the swivel wheel 48. A reference numeral 50 denotes a protrusion that protrudes toward the side of the compression portion 46 at the axis center of the swivel wheel 48.

Thus, in the microbubble generator 43, when water flows into the agitator portion 45, the swivel wheel 48 is rotated by the water flowing through the inflow paths 49 of the swivel wheel 48. Due to the rotation of the swivel wheel 48, a swirl flow arises, and the water is agitated by the agitator portion 45 and flows into the compression portion 46. The water is then compressed by the tapered flow path of the compression portion 46, whose diameter narrows. After that, the compressed water flows into the decompression portion 47 and the pressure is released, and thus dissolved air in the water appears as μm-sized bubbles (microbubbles).

Figure 3:
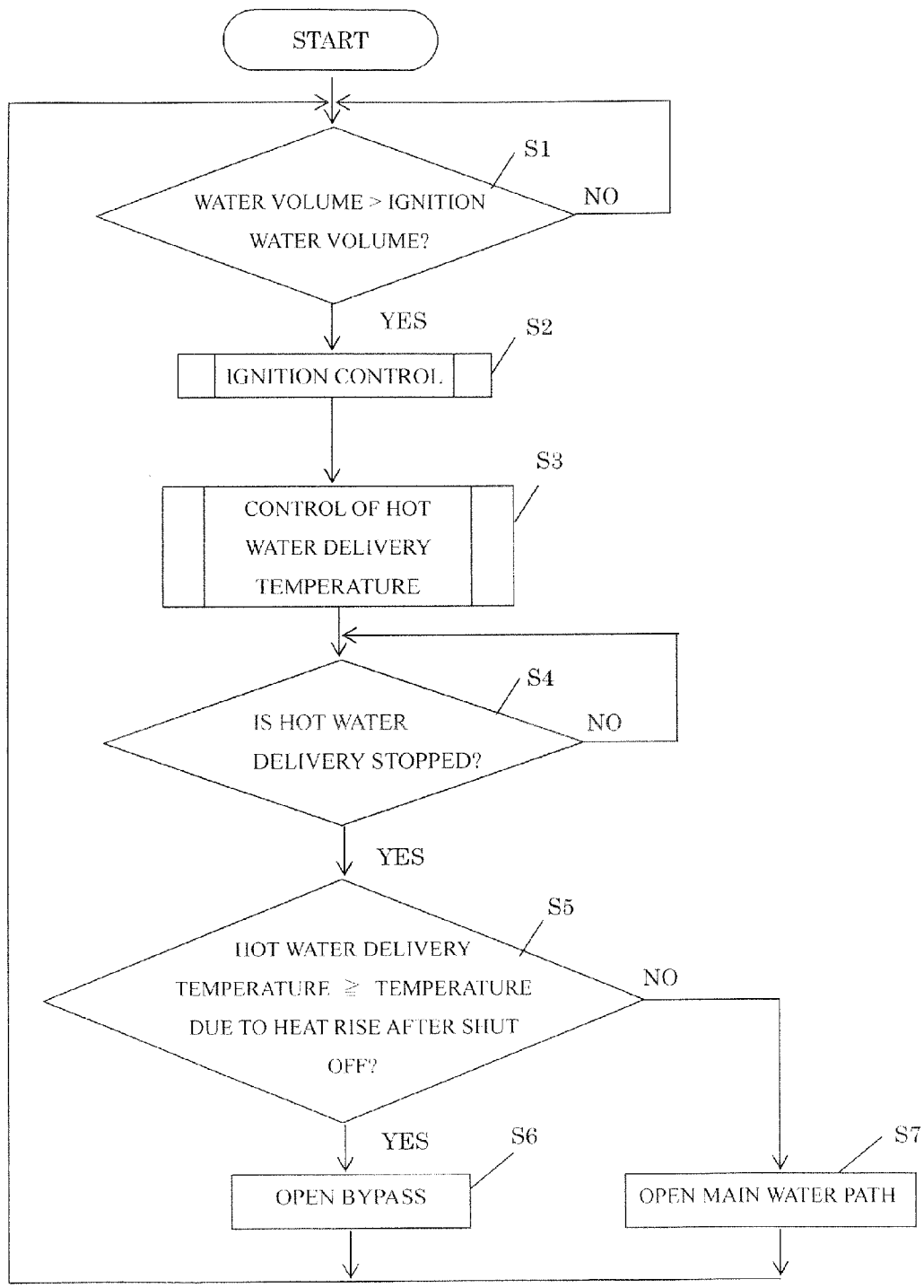
FIG. 3 is a flowchart showing an operation of the water heater.

An operation of the water heater 1 that is configured as described above will be explained with reference to a flowchart shown in FIG. 3.

First, at step S1, when a hot water faucet 20 is opened, the controller 12 detects by the water volume sensor 17 that a volume of water inside the water heater 1 exceeds an ignition water volume. At step S2, the controller 12 performs ignition control. In the ignition control, a prepurge is performed by rotation of the air supply fan 3, and then the master solenoid valve 9, the switching solenoid valves 11 and the gas proportional valve 10 are respectively opened to supply gas to the burners 4. At the same time, the igniter 13 is activated. Next, at step S3, after the controller 12 has confirmed the ignition of the burners 4 using the flame rod 15, the controller 12 performs hot water delivery control so that the temperature of the delivered hot water matches with the set temperature. In hot water delivery control at step S3, an amount of gas is continuously changed by control of an opening of the gas proportional valve 10 in accordance with a difference between the hot water delivery temperature detected by the second thermistor 22 and the set temperature that has been set using the remote control 23.

At this time, as the valve stem 38 of the valve 36 is in the first position of the switching portion 30, the bypass 35 is blocked off. Therefore, the water passes through the main water path 34 and microbubbles are not generated.

If the hot water faucet 20 is closed and the hot water delivery is stopped at step S4, the controller 12 monitors the hot water delivery temperature obtained from the first thermistor 21, and determines whether or not a pre-set temperature due to heat rise after shut off is reached within a predetermined time period at step S5. If the temperature raised due to heat after shut off reaches the pre-set temperature, the controller 12 drives the stepping motor 42 at step S6 and moves the valve stem 38 to the second position. Thus, the main water path 34 is blocked off and the bypass 35 is opened, as shown by the broken lines in FIG. 2.

Thereafter, if delivery of hot water is restarted (step S1 to step S3), the water passes through the water supply pipe 6 via the bypass 35. Thus, when the water passes through the microbubble generator 43, the microbubbles are generated in the manner described above. As a result, water containing microbubbles passes through the heat exchanger 5 so that built-up scale inside the pipes of the heat exchanger 5 is removed. On the other hand, in the determination at step S5, if it is determined that the hot water delivery temperature does not reach the temperature due to heat rise after shut off the main water path 34 is kept open as it is, at step S7.

After delivery of hot water is restarted, if the delivery of hot water containing the microbubbles is stopped at step S4, the controller 12 also restarts to monitor the hot water delivery temperature by the thermistor 21 at step S5. Here, again, if the hot water delivery temperature reaches the pre-set temperature due to heat rise after shut off within the predetermined time period, the bypass 35 is kept open as it is, at step S6. However, if the hot water delivery temperature does not reach the pre-set temperature due to heat rise after shut off, the controller 12 drives the stepping motor 42 at step S7 and moves the valve stem 38 to the first position, thus blocking off the bypass 35 and opening the main water path 34. Accordingly, when delivery of the hot water is restarted, the water passes through the water supply pipe 6 via the main water path 34, and thus, the microbubbles are not generated.

In this manner, according to the water heater 1 of the above-described embodiment, on the side of the water supply pipe 6, the bypass 35 is formed that branches from the main water path 34 and that bypasses part of the main water path 34. At the same time, the flow path switching unit (the valve 36 and the stepping motor 42) is provided at the branching portion of the main water path 34 and the bypass 35. The flow path switching unit is controlled by the controller 12 and can selectively switch the flow path to one of either the main water path 34 or the bypass 35. Meanwhile, the microbubble generator 43 generating microbubbles is provided on the bypass 35 and includes the agitator portion 45, the compression portion 46 and the decompression portion 47. When the controller 12 determines that scale has built up, the controller 12 uses the flow path switching unit to switch the flow path to the bypass 35. Thus, water containing the generated microbubbles passes inside the water heater 1. As a result, it is possible to automatically remove the scale using the microbubbles. Special maintenance to remove scale is therefore unnecessary.

It should be noted that the effect of removing scale using microbubbles has been confirmed in related literature, namely in "Effects of bubble behavior on erosion corrosion of copper tubes in hot-water supply system" in "Zairyo to Kankyo (Materials and Environments)" (issued by the Japanese Society of Corrosion Engineering) vol. 58 (2009), No. 3, pp. 99-104.

In particular, in the above-described embodiment, the agitator portion 45 houses the swivel wheel 48 that rotates due to the inflow of water, the compression portion 46 is communicatively connected to the agitator portion 45 and serves as a tapered flow path whose diameter narrows progressively toward the downstream side, and the decompression portion 47 is communicatively connected to the compression portion 46 and serves as a tapered flow path whose diameter widens progressively toward the downstream side. As a result, it is possible for the microbubble generator 43 to have a compact structure that can easily be assembled into the bypass 35.

It should be noted that a solenoid valve or the like can be used as the flow path switching unit. Further, the microbubble switching portion is not limited to the mode in which the main water path and the bypass are branchingly formed inside the casing, and a bypass pipe may be branchingly connected to the water supply pipe.

Additionally, in the above-described embodiment, the water heater is described in which the bypass pipe is connected between the water supply pipe and the hot water delivery pipe, but the present invention can be applied even to a water heater that does not have a bypass pipe.

What is claimed is:

1. A water heater comprising:
    a burner;
    a heat exchanger heated by the burner;
    a water supply pipe and a hot water delivery pipe that are connected to the heat exchanger respectively; and
    a control unit controlling combustion by the burner, wherein the control unit is electrically connected to a temperature detection unit;
    wherein
    water passing through the heat exchanger is heated by the burner and heated water is delivered, and
    when a temperature detected by the temperature detection unit provided on the hot water delivery pipe reaches a predetermined temperature due to heat rise after hot water delivery is stopped, the control unit determines that scale has built up inside pipes, and
    a bypass branching from a main water path is formed on the side of the water supply pipe to bypass a part of the main water path, and a flow path switching unit is provided at a branching portion of the main water path and the bypass, the flow path switching unit being controlled by the control unit and being able to selectively switch a flow path between one of the main water path and the bypass,
    a microbubble generator being provided on the bypass, generating microbubbles and including a water agitator portion, a compression portion and a decompression portion, and
    the agitator portion houses a swivel wheel that rotates as a result of an inflow of water, the compression portion is communicatively connected to the agitator portion and serves as a tapered flow path whose diameter narrows progressively toward the downstream side, and the decompression portion is communicatively connected to the compression portion and serves as a tapered flow path whose diameter widens progressively toward the downstream side, and
    when the control unit determines that scale has built up, the control unit uses the flow path switching unit to perform switching of the flow path so that the water passes through the bypass, and then water containing the generated microbubbles flows inside the water heater.

* * * * *